United States Patent [19]
Kida et al.

[11] Patent Number: 5,150,630
[45] Date of Patent: Sep. 29, 1992

[54] POWER SWITCHING APPARATUS WITH POWER SWITCHING TIMING

[75] Inventors: Shigeru Kida, Yamatokouriyama; Katsuyuki Sakai, Nara, both of Japan

[73] Assignee: Sharp Kabushiki Kaisha, Osaka, Japan

[21] Appl. No.: 703,670

[22] Filed: May 21, 1991

[30] Foreign Application Priority Data

May 23, 1990 [JP] Japan .................................. 2-134311

[51] Int. Cl.$^5$ .............................................. F16H 3/34
[52] U.S. Cl. ......................................... 74/354; 74/384
[58] Field of Search ................. 74/354, 380, 384, 406, 74/421 A; 358/412, 413, 414, 415, 396

[56] References Cited

U.S. PATENT DOCUMENTS

| | | | |
|---|---|---|---|
| 3,028,767 | 4/1962 | Moore | 74/354 |
| 3,854,670 | 12/1974 | Bertolazzi | 74/354 |
| 4,709,865 | 12/1987 | Bounds | 74/384 X |
| 4,843,903 | 7/1989 | Tanaka et al. | 74/354 |
| 4,866,531 | 9/1989 | Kobori et al. | |
| 5,031,471 | 7/1991 | Watanabe | 74/384 |

FOREIGN PATENT DOCUMENTS

| | | | |
|---|---|---|---|
| 645744 | 6/1937 | Fed. Rep. of Germany | 74/354 |
| 591956 | 9/1975 | Fed. Rep. of Germany | |
| 3836246 | 10/1988 | Fed. Rep. of Germany | |
| 1325666 | 3/1962 | France | 74/384 |
| 2453324 | 3/1988 | France | |
| 58-200845 | 11/1983 | Japan | 74/354 |
| 58-214055 | 12/1983 | Japan | 74/354 |
| 61-184248 | 8/1986 | Japan | |
| 63-155862 | 6/1988 | Japan | |
| 2085534 | 4/1982 | United Kingdom | 74/354 |
| 2049097 | 12/1988 | United Kingdom | |

OTHER PUBLICATIONS

IBM Technical Disclosure Bulletin, vol. 15, No. 10, Mar. 1973.
Patent Abstract of Japan, vol. 14, #243, May 23, 1990 for JP-2-66039(A).

*Primary Examiner*—Rodney H. Bonck
*Assistant Examiner*—Ryan W. Massey

[57] ABSTRACT

A power switching apparatus in accordance with present disclosure includes a sun gear which can be driven to rotate in a first and second direction, an arm which can swing freely relative to the rotating axis of the sun gear. A transfer gear is pivotally provided at the arm for engaging with the sun gear. There is a pair of driven gears disposed a prescribed distance apart from each other in the circumferential direction of the sun gear so that each of said driven gears can engage independently with the transfer gear. A control device controls the position of the transfer gear so that the transfer gear can engage with one of the driven gears before initiation of rotation of the sun gear.

12 Claims, 7 Drawing Sheets

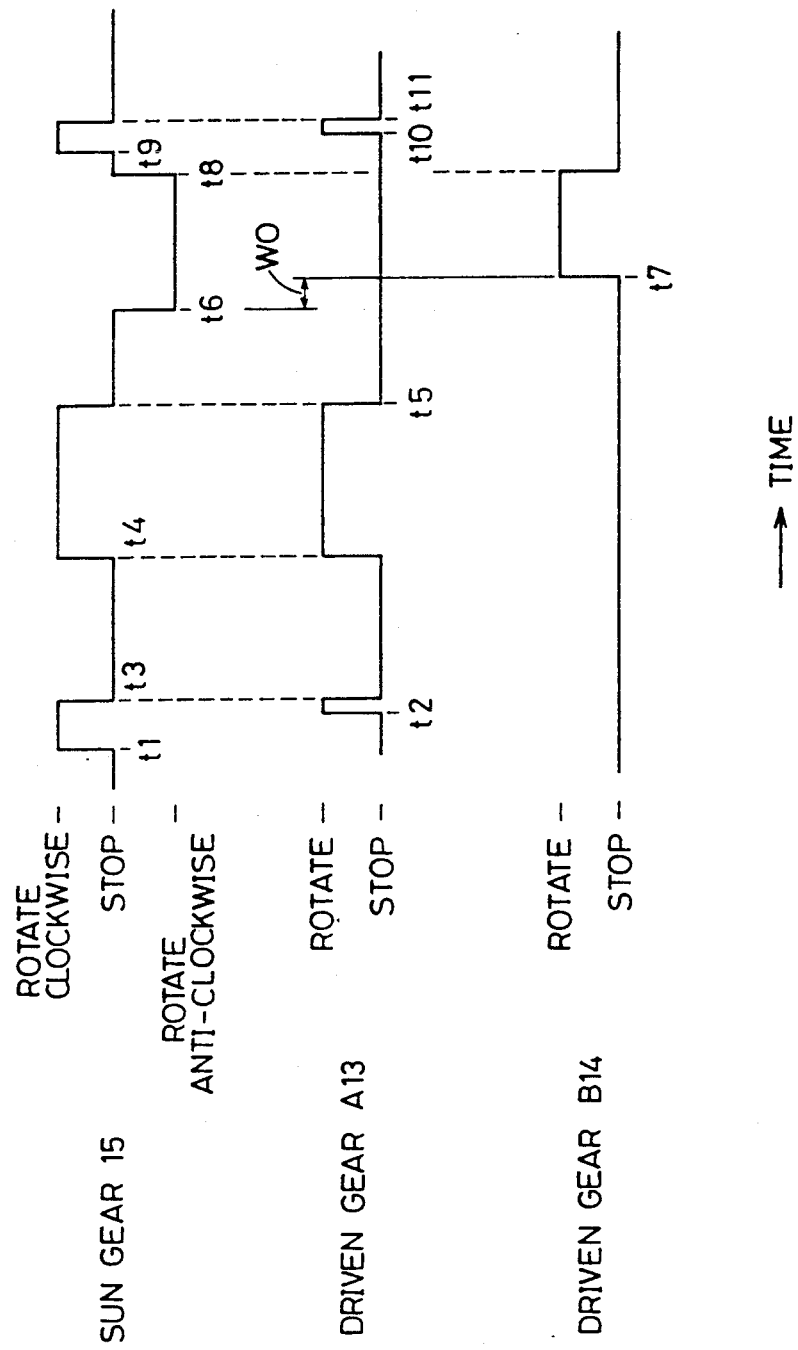

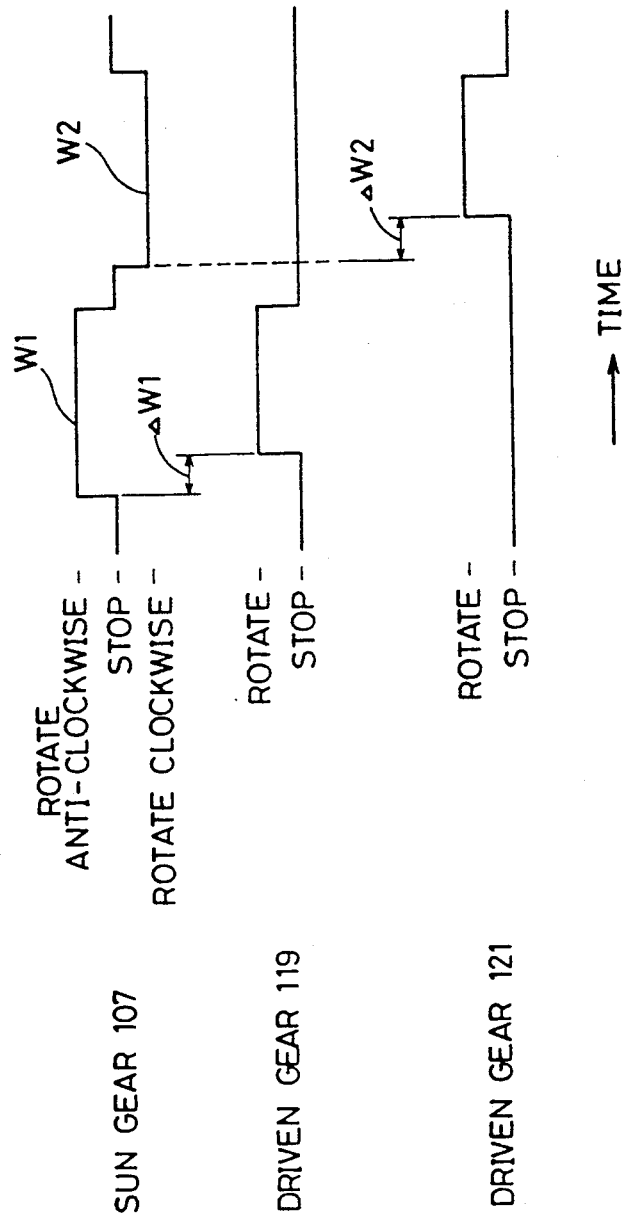

POWER SWITCHING APPARATUS WITH POWER SWITCHING TIMING

BACKGROUND OF THE INVENTION

1. Field of the Invention

The present invention relates generally to a power switching apparatus and, more particularly, to a power switching apparatus for transmitting driving force created by one driving power source to two systems of gear groups by changing the direction of rotation.

2. Description of the Background Art

Unlike a facsimile machine of a separate type having separate structures for transmission and reception, a facsimile machine capable of both transmission and reception has advantages that not only the entire apparatus can be made compact and less costly but also operation noises and power consumption can be reduced, and maintenance thereof can be simplified since driving means and structures supporting the driving means can be shared for transmission and reception.

FIGS. 6A and 6B are views showing a rotating transmission structure which can be incorporated in such a facsimile machine, etc., which is disclosed in Japanese Patent Laying-Open No. 61-184248.

Referring to the figures, the structure and operation thereof will be briefly described.

As shown in FIG. 6A, a driving motor 102 normally rotates to cause a worm 103 to rotate in the direction of arrow a, thereby rotating a sun gear 107 in the direction of arrow b. The rotation of the sun gear 107 drives a swinging arm 110 friction-coupled thereto to swing in the direction of arrow c to a first position, thereby engaging a second transfer gear 115 with a first gear 119, so that the gear 119 is rotated in the direction of arrow d. When the driving motor 102 is reversely rotated, as shown in FIG. 6B, the worm 103 is rotated in the direction of arrow e to rotate the sun gear 107 in the direction of arrow f. The rotation of the sun gear 107 then drives the swinging arm 110 friction-coupled thereto to swing in the direction of arrow g from the first position to a second position, thereby engaging a first transfer gear 113 to a second gear 121, so that the gear 121 is rotated in the direction of arrow h. The first and second gears 119 and 121 are coupled to two systems of gear groups, respectively, and, therefore, each being rotated, drive the respective gear groups to rotate.

In such a structure, even with one driving power source (the driving motor 102), the transmission system of rotating movement can be changed by shifting the direction of rotation thereof, to adapt to transmission operation or reception operation by a facsimile machine, etc.

In other words, a power switching apparatus is implemented by driving a sun gear to rotate by power generated by a motor, providing transfer gears to be engaged to the sun gear pivotally around an arm disposed around the rotating axis of the sun gear which can swing freely and by providing a pair of driven gears at a distance apart from each other in the circumferential direction of the sun gear.

The sun gear 107 is driven to rotate in one direction in a time period W1 as shown in FIG. 7, so that one of the driven gears 119 is driven to rotate, thereby feeding an original for transmission, while at the time of reception the sun gear 107 is driven to rotate reversely in a period W2 to carry a sheet of recording paper, thereby driving the other driven gear 121 to rotate. When the sun gear 107 is driven to rotate in one direction, the driven gear 119 is driven to rotate with a time delay of $\Delta W1$, shown in FIG. 6. The time $\Delta W1$ is time required for the transfer gear 115 to be engaged with the driven gear 119. When the sun gear 107 is rotated reversely, the other driven gear 121 is driven to rotate with a time delay of $\Delta W2$. The time delays $\Delta W1$ and $\Delta W2$ vary in accordance with the angular position when an arm 110 stops, which varies due to frictions and so forth. The time $\Delta W1$ and the time $\Delta W2$ fluctuate accordingly.

Such fluctuation in time delay gives rise to the following problems in a conventional power switching apparatus.

In a facsimile machine capable of both transmission and reception, if an original is carried after $\Delta W1$ elapse since a sun gear is driven to rotate to read the original, for example, variation in this time delay $\Delta W1$ causes a change in time of the original to be carried arriving at a reading head. This causes variation of reading initiation time accordingly. It is desired to transmit the original image accurately by advancing the reading initiation time at the tip of the original. Such time delays $\Delta W1$ and $\Delta W2$ in the operation of the respective driving gears are desirably constant not only in the facsimile machine both capable of transmission and reception as described above but also in any other apparatuses having such a power switching structure.

SUMMARY OF THE INVENTION

One object of the present invention is to achieve power switching in a power switching apparatus at a high accuracy.

Another object of the present invention is to achieve power switching in a power switching apparatus in accurate timings.

In order to achieve the above described objects, a power switching apparatus in accordance with the present invention includes a sun gear which can be driven to rotate in either direction; an arm which can swing freely relative to the rotating axis of the sun gear; a transfer gear rotatably provided at the arm for engaging with the sun gear; a pair of driving gears disposed a prescribed distance apart from each other in the circumferential direction of the sun gear so that each of the driven gears can engage with the sun gear independently; and control means for controlling the position of the transfer gear so that the transfer gear engages with one of the driven gears before the initiation of the rotation of the sun gear.

The power switching apparatus having such a structure as described above can achieve the power switching in an accurate timing because the transfer gear is engaged with a prescribed driven gear before the rotation of the sun gear.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a waveform chart showing the operation of a sun gear and, driven gears A and B for explaining the control operation by the processing circuit shown in FIG. 1;

FIG. 7 is a waveform chart showing the operation of each gears for explaining the operation of the conventional power switching apparatus.

DESCRIPTION OF THE PREFERRED EMBODIMENTS

Figure 1:
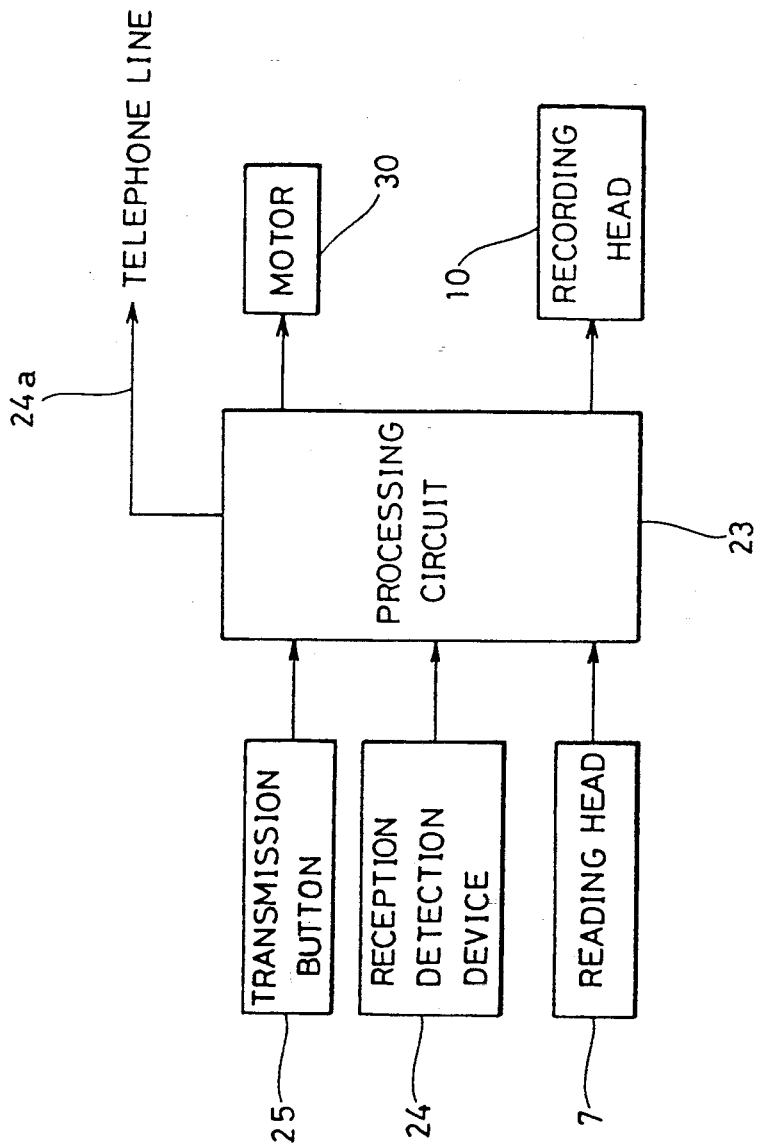
FIG. 1 is a block diagram showing an electrical structure of a facsimile machine in accordance with one embodiment of the present invention.

FIG. 1 is a block diagram showing an electrical structure of a facsimile machine in accordance with one embodiment of the present invention.

A processing circuit 23 implemented by microcomputer, etc. is connected to a telephone line 24a. A reception detection device 24 detects facsimile reception, and a recording head 10 is operated upon reception. An original is facsimile-transmitted by operating a transmitting button 25, and a reading head 7 is operated upon transmission. Both in transmission and reception, a pulse motor 30 is driven.

Figure 2:
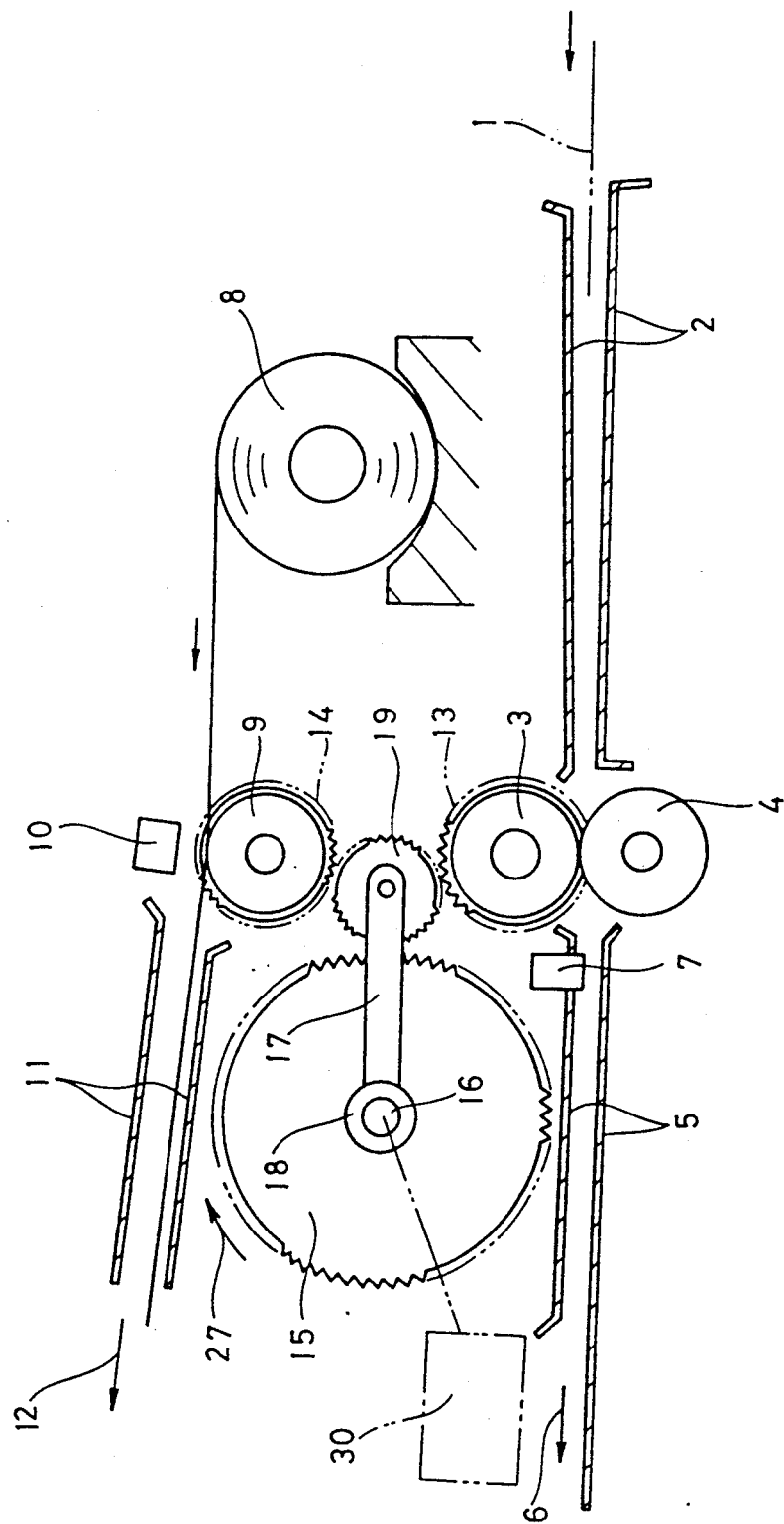
FIG. 2 is a sectional view showing a structure of a power switching apparatus incorporated in the facsimile machine shown FIG. 1.

FIG. 2 is a sectional view showing a structure of a power switching apparatus incorporated in the facsimile machine capable of both transmission and reception shown in FIG. 1.

In FIG. 2, upon transmission, an original 1 is fed interposed between a pair of rollers 3 and 4 through a guide member 2, to be fed in the direction of arrow 6 through a guide member 5. The contents of the original are read by the reading head 7, e.g. a line image sensor. The data on the original image read by the reading head 7 is transmitted through the telephone line 24a, etc. shown in FIG. 1.

Upon reception, a received image received through the telephone line 24a is recorded by the recording head 10 intermittently pressure-contacted to a platen roller 9 into a sheet of heat sensitive recording paper which is stored in a rolled manner and taken out sequentially. Thus recorded paper is discharged through a guide member 11 as shown by arrow 12. To the roller 3 and the platen roller 9 fixed are driven gears 13 and 14.

The sun gear 15 is fixed to a rotating axis 16, and is driven to rotate by the pulse motor 30 capable of rotating normally and reversely. The rotating axis 16 is inserted through the sleeve 18 of the arm 17, and, therefore, the arm 17 can swing around the rotating axis 16 of the sun gear 15. The transfer gear 19 to be engaged with the sun gear 15 is pivotally provided at the tip of the arm 17. The driven gears 13 and 14 are disposed a prescribed distance apart from each other in the circumferential direction of the sun gear 15 so that the transfer gear 19 can engage with the driven gear 13 and 14 selectively depending upon its position.

Figure 3:
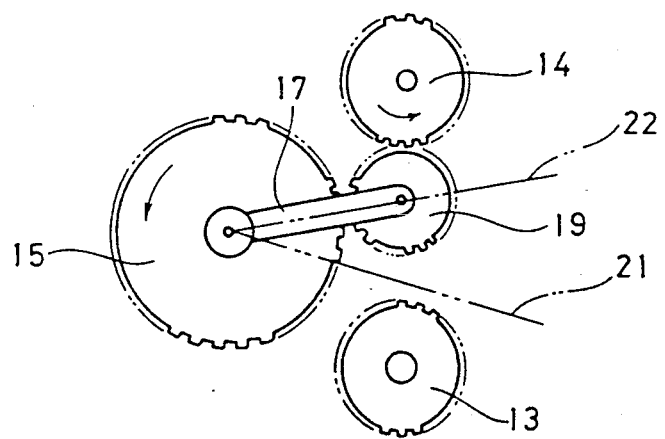
FIG. 3 a view showing a part of the structure shown in FIG. 2 by way of simplification.

FIG. 3 is a view showing the sun gear 15, the arm 17, the transfer gear 19, and the driven gears 13 and 14 shown in FIG. 2 by way of simplification.

The sun gear 15 rotates clockwise to cause the line along the axis of the arm 17 to move to a position represented by reference numeral 21, and the transfer gear 19 engages with the driven gear A 13, thereby performing reading operation. On the other hand, the sun gear 15 rotates anti-clockwise to cause the axis line of the arm 17 to move to a position represented by reference numeral 22, so that the transfer gear 19 engages with the driven gear B 14, thereby performing recording operation.

Figure 4:
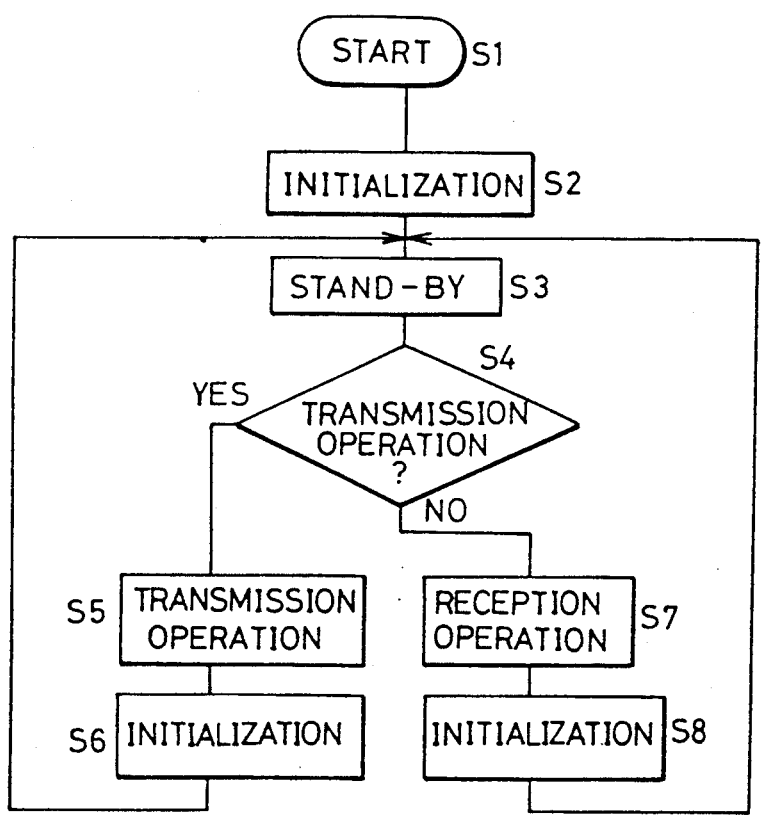
FIG. 4 is a flow chart showing the control of a processing 23 shown in FIG. 1.
Figure 6A:
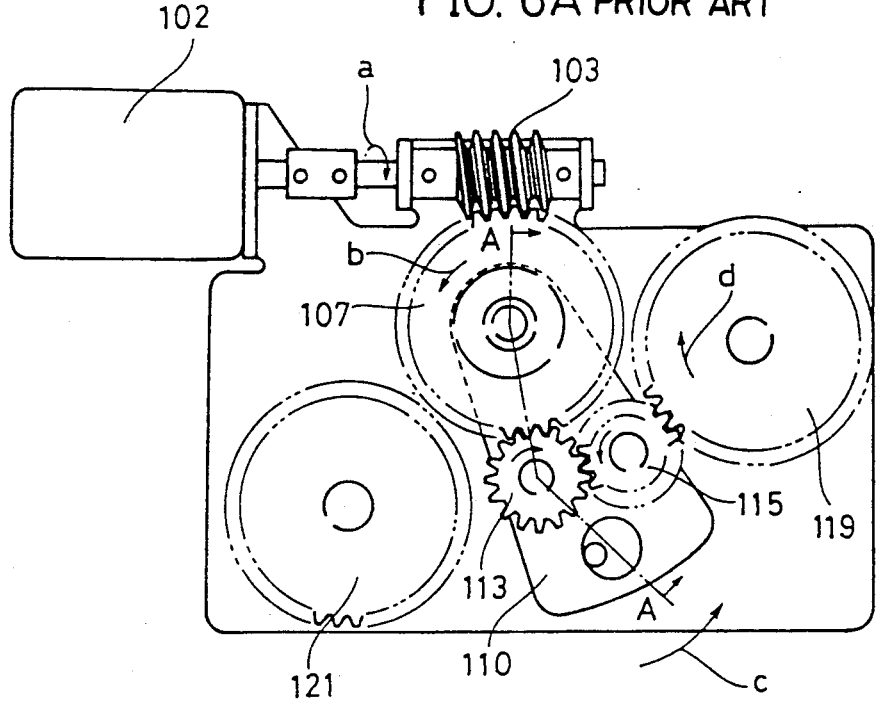
FIG. 6A and 6B are views showing a structure of a conventional switching apparatus.
Figure 6B:
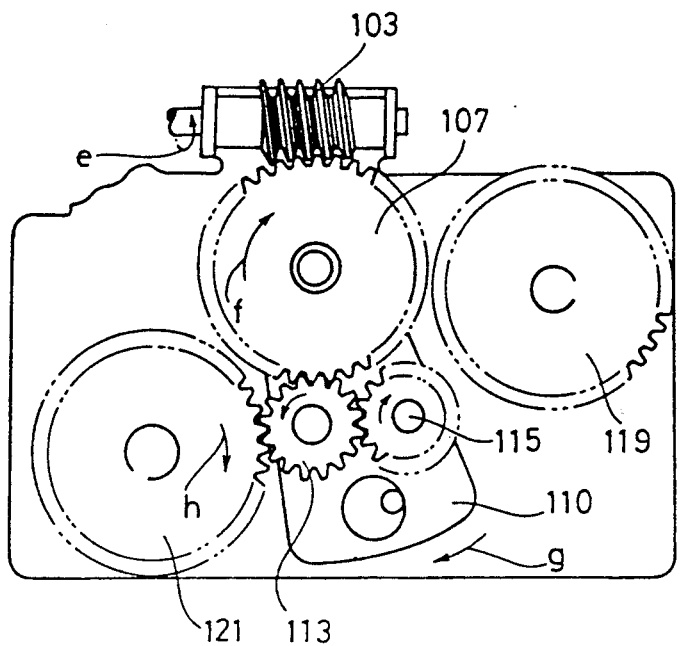

FIG. 4 is a flow chart showing the operation of the processing circuit 23 shown in FIG. 1, and FIG. 5 is a waveform chart of the sun gear, the driven gears A and B for clarifying the operation of the processing circuit 23.

In step S1, the switch for power supply is turned on to start the process flow. In step S2, initialization is executed. In other words, the sun gear 15 is rotated clockwise as shown by reference numeral 27 in FIG. 2 in a time period from t1 to t3 in FIG. 5, thereby executing initialization. The transfer gear 19 thus moves to the direction of the driven gear A 13 to engage therewith, and the driven gear A 13 rotates slightly in a time period from t2 to t3 as shown in FIG. 5. In step S3, the engagement state is maintained as in a stand-by state.

In step S4, it is determined whether a transmission button 25 is pressed or not. If the transmission button 25 is pressed, the flow proceeds to step S5 for transmission operation, and the sun gear 15 is driven to rotate in the direction of arrow 27 by a pulse motor 30 in time t4. Power from the sun gear 15 immediately drives the roller 3 through the transfer gear 19 and the driven gear A 13 in a time period t4-t5, because the transfer gear 19 is already engaged with the driven gear A 13. Also, the rotation of the roller 3 drives the roller 4 in contact with the roller 3 so that the original interposed between these rollers is fed in the direction of arrow 6. The fed original image is read by the reading head 7 to perform the facsimile transmission.

In step S6, the initialization state, i.e. the state in which transfer gear 19 is engaged with the driven gear 13 is maintained by the rotation of the sun gear 15 in the direction of arrow 27 as described above.

In step S4, it is determined that the apparatus is not in transmission operation, in other words a facsimile reception state is detected by the reception detection device 24, the pulse motor 30 drives the sun gear 15 to rotate reversely to the direction of arrow 27. The transfer gear 19 therefore moves in accordance with the anticlockwise rotation of the sun gear from the axis line position 21 (see FIG. 3) to the axis line position 22, so that transfer gear 19 engages with the driven gear B 14 in time t7. The driven gear 14 is thus driven to rotate by the sun gear 15 during a time period from t7 to t8, the sheet of recording paper 8 on which the received data is recorded by the recording head 10 is discharged in the direction of arrow 12. The reception operation being completed, the pulse motor 30 drives the sun gear 15 to rotate in the direction of arrow 27 in a time period t9-t11 in initialization operation. The transfer gear 19 therefore moves to the axis line position 21 from the axis line position 22, to engage with the driven gears A 13. The driven gear A 13 rotates slightly in a time period from t10-t11 as shown in FIG. 5.

In this embodiment, when the sun gear 15 is not driven, the transfer gear 19 and the arm 17 spontaneously return to the position 21 by their own weights so that the initialization operation is achieved in a stable manner.

In this embodiment, the transfer gear 19 returns to the side of the driven gear by its own weight, but springs, etc. may be used to constantly energize the planetary gear to the side of one of the driven gears.

Thus, upon the transmission, the power of sun gear 15 is immediately transmitted to the driven gear 13 through the transfer gear 19 by the pulse motor 30 in time t4. In other words, the driving force of the pulse motor 30 is immediately transmitted to the rollers 3 and 4. Also, upon the reception, when the sun gear 15 is rotated at a constant rotating speed by the pulse motor 30, the planetary gear 19 engages with the driven gear B 14 after a constant time WO from t6 to t7. Thus, both in the transmission operation and the reception operation, the original 1 and the sheet of recording paper 8 can be fed in accurate timing.

Although in the above described embodiment, the transfer gear 19 is positioned on the side of the driven gear A as in a stand-by state, it goes without saying that similar effect can be obtained if the transfer gear 19 is positioned on the side of the driven gear B in the standby state.

In an alternative embodiment, an electromagnetic solenoid may be provided to shift the arm 17 angularly in the clockwise direction shown in FIG. 2 to initialize the position of the transfer gear 19 always in a constant position.

Although in the above described embodiment, the present invention is applied to a facsimile machine, the present invention can be applied similarly to power switching apparatuses in other fields having similar structures.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power switching apparatus, comprising:
    a sun gear which can be driven to rotate in a first direction and a second direction which is opposite to said first direction;
    an arm having a first and second end, the first end attached to the rotating axis of the sun gear by means for allowing said arm to swing freely relative to the rotating axis of said sun gear;
    a transfer gear pivotally provided at said second end of said arm for engaging with said sun gear;
    a pair of driven gear disposed a prescribed distance apart from each other in the circumferential direction of said sun gear so that each of said driven gears can engage with said planetary gear independently; and
    control means for controlling the position of said transfer gear so as to engage said transfer gear with one of said driven gears, before the initiation of the rotation of said sun gear, wherein said transfer gear moves by its own weight to engage with one of said driven gears when said sun gear is not rotated.

2. The power switching apparatus in accordance with claim 1, wherein said control means rotates said sun gear in a prescribed direction in a prescribed time period when the driving of said sun gear is completed.

3. The power switching apparatus in accordance with claim 1 further comprising a pulse motor capable of rotating said sun gear in said first and second direction in response to a prescribed detection state.

4. A power switching apparatus used in a facsimile machine capable of both transmission operation and reception operation, comprising:
    a sun gear which can be driven to rotate in a first direction and a second direction which is opposite to said first direction; by one driving power source;
    an arm having a first and second end said first end attached to the rotating axis of the sun gear by means for allowing said arm to swing freely relative to the rotating axis of said sun gear;
    a transfer gear rotatably provided at said second end of said arm for engaging with said sun gear;
    a pair of driven gears one of which is driven in transmission operation and the other is driven in reception operation, each being disposed a prescribed distance apart from each other in the circumferential direction of said sun gear so that each can engage with said planetary gear independently; and
    control means for controlling the position of said transfer gear so as to engage said transfer gear with one of said driven gears, before the initiation of the rotation of said sun gear, wherein said transfer gear is moved by its own weight to engage with one of said driver gears when said sun gear is not rotated.

5. The power switching apparatus in accordance with claim 4, wherein said control means rotates said sun gear in a prescribed direction in a prescribed time period upon the completion of the driving of said sun gear.

6. The power switching apparatus in accordance with claim 4, wherein said driving power source comprises a pulse motor capable of rotating normally and reversely.

7. The power switching apparatus in accordance with claim 6, further including,
    determining means for determining whether the apparatus is in a transmission state or a reception state,
    wherein said pulse motor drives said sun gear to rotate in a prescribed direction in response to the output of said determining means.

8. A facsimile machine for transmission and reception of information comprising:
    a reading head for use in sending information;
    a recording head for use in receiving information; and
    means for feeding material toward said heads, said means including,
    (a) a sun gear which can be driven in a clockwise and counter-clockwise direction,
    (b) an arm capable of swinging freely relative to the rotating axis of said sun gear,
    (c) a transfer gear pivotally provided at said arm for engaging with said sun gear,
    (d) a pair of driven gears disposed a prescribed distance apart from each other in the circumferential direction of said sun gear so that each of said driven gears can engage with said transfer gear independently; and
    (e) control means for controlling the position of said transfer gear so as to engage said transfer gear with one of said driven gears, before the initiation of the rotation of said sun gear.

9. The facsimile machine in accordance with claim 8, wherein said control means rotates said sun gear in a prescribed direction in a prescribed time period when the driving of said sun gear is completed.

10. The facsimile machine in accordance with claim 8, wherein said transfer gear moves by its own weight to engage with one of said driven gears when said sun gear is not rotated.

11. The facsimile machine in accordance with claim 8 further comprising a pulse motor capable of rotating normally and reversely for driving said sun gear in a prescribed direction in response to a prescribed detection state.

12. The facsimile machine according to claim 8, wherein the arm has a first end and a second end and the first end is attached to the rotating axis of the sun gear by means for allowing the arm to swing freely relative to the rotating axis of said sun gear.

* * * * *